(12) United States Patent
Kai

(10) Patent No.: US 6,837,953 B2
(45) Date of Patent: Jan. 4, 2005

(54) WOODEN TILES AND BOARDS AND METHODS FOR MAKING THE SAME

(76) Inventor: Richard H. Kai, 3181 S. Emerson St., Englewood, CO (US) 80110

( * ) Notice: Subject to any disclaimer, the term of this patent is extended or adjusted under 35 U.S.C. 154(b) by 0 days.

(21) Appl. No.: 10/445,160

(22) Filed: May 24, 2003

(65) Prior Publication Data

US 2003/0205316 A1 Nov. 6, 2003

Related U.S. Application Data

(63) Continuation-in-part of application No. 09/672,554, filed on Sep. 28, 2000, now Pat. No. 6,576,079.

(51) Int. Cl.[7] .......................... B32B 21/00; B32B 21/14; B27D 1/00
(52) U.S. Cl. ...................... 156/182; 156/250; 156/256; 144/346; 144/350; 428/220
(58) Field of Search ...................... 156/182, 71, 250, 156/256, 260, 264; 144/346, 350, 345; 428/220, 537.1, 44, 45, 51

(56) References Cited

U.S. PATENT DOCUMENTS 4,122,878 A  *  10/1978  Kohn .......................... 144/350

5,618,371 A  *  4/1997  Sing .......................... 156/264

FOREIGN PATENT DOCUMENTS

| GB | 2101523 A | * | 1/1983 | ............ B27M/3/00 |
| GB | 2144076 A | * | 2/1985 | ............ B27L/5/00 |
| JP | 06008207 A | * | 1/1994 | ............ B27D/5/00 |

OTHER PUBLICATIONS

ICONSTRUX Consulting Services, Reclaimed Wood Flooring: The Best Kept Construction Industry Secret, available at http://www.iconstrux.com/img/inews/10.1.pdf.*

* cited by examiner

*Primary Examiner*—Sue A. Purvis
(74) *Attorney, Agent, or Firm*—Nellie C. Kaufman, Esq.

(57) ABSTRACT

Wooden tiles and boards and methods for making the same are disclosed. The wooden tiles and boards are sliced from a rectangular, elongate composite beam or block, respectively, which are each formed by assembling and securely adhering together a plurality of elongate wood pieces and possibly one or more non-wood products. The beam or block is then sliced into individual tiles or boards having a substantially uniform tile thickness and a predetermined pattern at least partially composed of end grain wood which is substantially consistent among all of the tiles and boards. Tiles and boards having a combination of end grain wood and flat grain wood are also disclosed, as well as a border produced by an combination of tiles and boards.

23 Claims, 12 Drawing Sheets

WOODEN TILES AND BOARDS AND METHODS FOR MAKING THE SAME

This is a continuation of application Ser. No. 09/672,554, filed Sep. 28, 2000, now U.S. Pat. No. 6,576,079.

FIELD OF THE INVENTION

The present invention relates generally to mass-produced tiles and boards comprising mostly or entirely wood products and methods for making the same, and more particularly to tiles and boards comprising different species of flat grain and end grain wood products and methods for making the same.

BACKGROUND OF THE INVENTION

Wooden tiles and boards have long been utilized as a floor covering, ceiling or wall covering, a border for carpeted floors, and for other decorative purposes. It is generally considered that end grain wood is superior to flat grain wood with regard to many of these applications. For example, end grain wood is substantially more durable than flat grain wood, especially with regard to floor tiles and boards. Thus, wooden tiles and boards having a front or "wearing" surface which is at least partially or substantially comprised of end grain wood are much more durable than those comprised of only flat grain wood. Additionally, the appearance of end grain wood is unique in that a pattern of tree growth rings is revealed in the grain, as opposed to the more common "cathedral" grain pattern of flat grain wood.

Wooden tiles known as "parquetry" (for floor tiles) or "marquetry" (for other decorative purposes) generally comprise small pieces of wood which are manually arranged and adhesively bonded together to form each individual tile. Methods for making parquetry are shown in U.S. Pat. No. 4,731,140 dated Mar. 15, 1988 of Yontrarak for WOODEN TILE AND METHOD FOR MAKING THE SAME and U.S. Pat. No. 5,322,584 of Severson et al. for METHOD FOR MAKING WOODEN TILE, which are hereby incorporated by reference for all that is contained therein. It is noted in each of these patents that, while end grain wood is much more durable than flat grain wood, it also tends to be less flexible. Thus, using standard parquetry methods, tiles created with small pieces of end grain wood tend to break apart more easily than those made of flat grain wood. These patents attempt to improve on methods for assembling the small pieces of wood to create wooden tiles which are more flexible and stable.

Regardless of the improvements shown in these patents, the methods for making a parquetry or marquetry-type of wooden tile which involve manually assembling small pieces of wood to create individual tiles are extremely time-consuming and labor-intensive. Furthermore, since each tile or board is individually assembled using separately-cut pieces of wood, any two tiles produced are highly likely to have at least some inconsistencies in their surface patterns. In addition, there is a limit to the details which may be included in a parquetry or marquetry-type of wooden tile in that the individually-cut pieces of wood which make up the tile must be thick enough to be easily assembled. Thus, no thin lines of wood or other such inlay can reasonably be included in a wooden tile produced by standard methods without prohibitively raising the cost of such tile. Finally, as noted above, for tiles comprised of end grain wood pieces, special steps must be taken to assemble a tile which is more flexible and stable.

Wooden boards of the type used for flooring are typically comprised of a single type of wood, such as, for example, oak, cherry, or other hardwood. While it would be very desirable to produce a board having several different species of wood and/or intricate details and patterns, including repeating and/or continuous patterns therein, one would encounter the same problems noted above using traditional methods to produce such a board.

Thus, it is an object of the present invention to provide a method for efficiently making a plurality of wooden tiles.

It is another object of the present invention to provide a method for efficiently making a plurality of wooden boards having a repeating and/or continuous pattern thereon.

It is another object of the present invention to provide a method for making a plurality of wooden tiles and boards each having a front or "wearing" surface at least partially comprised of end grain wood, most preferably substantially comprised of end grain wood and/or a combination of flat grain wood and end grain wood. The resulting wooden tiles and boards should be stable and should not easily break apart.

It is another object of the present invention to provide a method for making a plurality of wooden tiles and boards having wood and/or non-wood inlays.

It is a further object of the present invention to provide a method for making a plurality of wooden tiles and boards having a consistent surface pattern thereon.

SUMMARY OF THE INVENTION

The present invention is directed to a method for making a plurality of wooden tiles or boards from an elongate composite beam or block. A plurality of elongate wood pieces are assembled and securely adhered together to form an elongate composite beam or block having a rectangular cross-sectional shape. A block differs from a beam in that the cross-sectional shape of the block has a width that is substantially longer than its height. The elongate composite beam or block is then sliced cross-sectionally such that each of the wooden tiles or boards has a predetermined, substantially uniform thickness. Each of the wooden tiles or boards also has a predetermined decorative pattern on at least one surface which is substantially consistent among the wooden tiles or boards and has the rectangular cross-sectional shape of the beam or block. The decorative pattern may have at least one repeating pattern portion and/or continuous pattern portion, and at least partially comprises end grain wood. In one embodiment, the decorative pattern has a combination of end grain wood and flat grain wood. After said slicing of the elongate composite beam or block, each of the plurality of elongate wood pieces substantially maintains its pre-assembled cross-sectional shape, and the plurality of elongate wood pieces are comprised of at least two different species of wood.

In one embodiment, at least one elongate piece of decorative, non-wood product may be assembled and securely adhered to the plurality of elongate wood pieces, such that the surface of each of the wooden tiles or boards is at least partially comprised of end grain wood and is also comprised of at least one decorative, non-wood product. Each of the elongate wood pieces, and the non-wood product if included, may be pre-finished within a predetermined tolerance such that, when assembled, the elongate wood pieces (and non-wood product, if included) form the elongate composite beam or block. The elongate wood pieces may be oriented such that the grain direction of at least one of the elongate wood pieces is generally perpendicular to a grain direction to at least another one of the elongate wood pieces in order to produce a decorative pattern comprising a combination of end grain wood and flat grain wood. Prior or subsequent to orienting the elongate wood pieces, adhesive may be applied to at least some of the elongate wood pieces. Then the elongate wood pieces (and non-wood product, if included) may be assembled to form the elongate composite beam or block, and the adhesive is allowed to completely cure.

Before assembling the elongate wood pieces, opposite, complementary curved edges may be cut into at least one pair of the elongate wood pieces. A thin, flexible, elongate wood piece or sheet or non-wood product may then be placed between the curved edges.

The elongate composite beam or block may be sliced very thinly to form veneer tiles or boards. These veneer tiles or boards may then be attached to a relatively inexpensive piece of wood having the same rectangular cross-sectional shape as the elongate composite beam or block to form the plurality of wooden tiles or boards.

The present invention is also directed to a method for making a border of wooden tiles and boards for a floor area. An elongate composite beam and elongate composite block are assembled and then sliced cross-sectionally to form a plurality of wooden tiles and a plurality of wooden boards. The wooden tiles and boards are then assembled around the floor area to form a border.

BRIEF DESCRIPTION OF THE DRAWINGS

Illustrative and presently preferred embodiments of the invention are shown in the accompanying drawings in which.

DETAILED DESCRIPTION OF THE INVENTION

Figure 1:
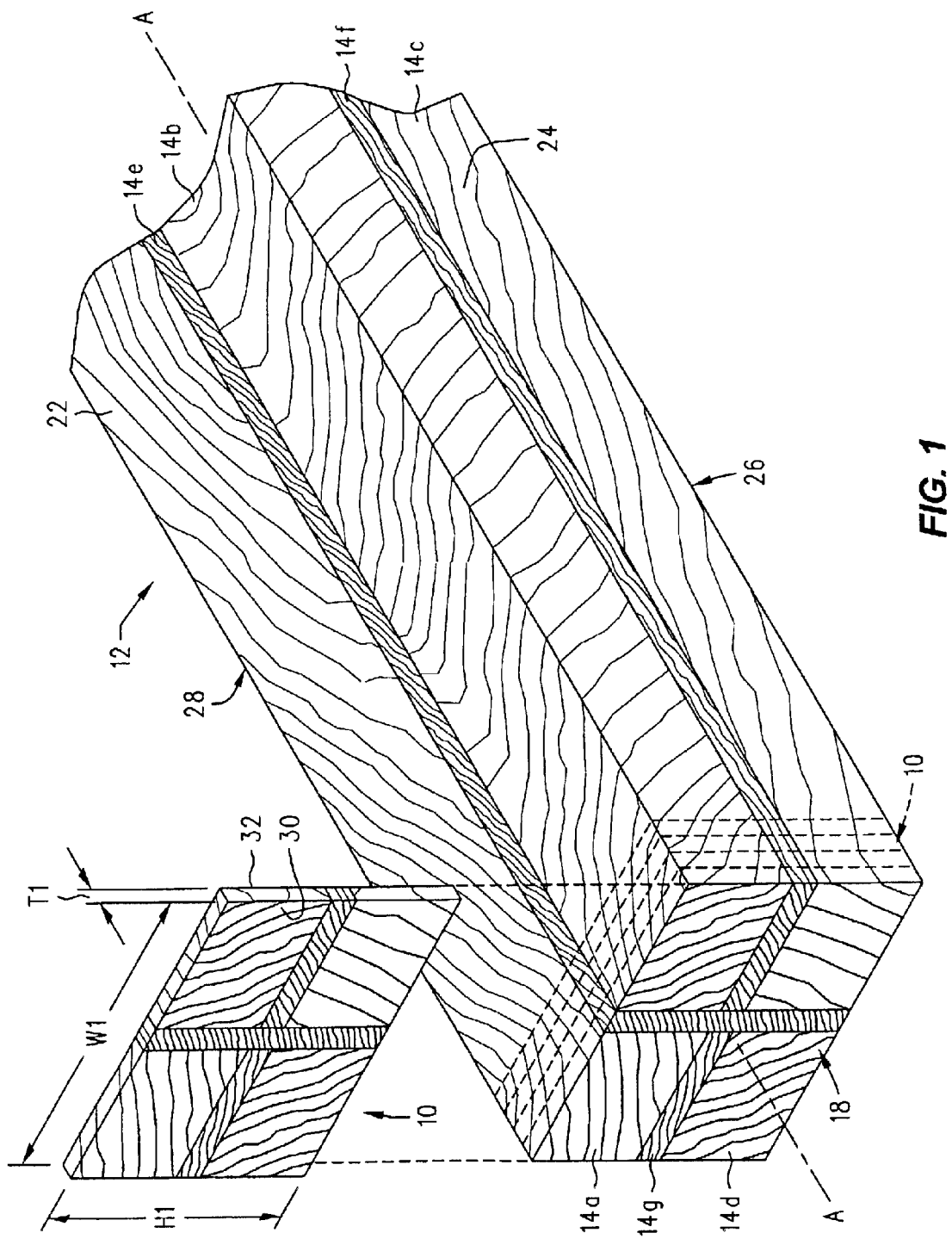
FIG. 1 is an isometric view of an elongate composite beam and wooden tile sliced therefrom.

The present invention is directed to a unique method for making a plurality of wooden tiles 10 from an elongate composite beam 12, FIG. 1. The elongate composite beam 12 is made up of pre-assembled and pre-adhered elongate wood beams, boards, laminate, veneer, or the like 14a–g. The elongate wood beams, boards, planks, laminate, veneer, or the like will be hereinafter referred to collectively as "elongate wood pieces". The term "elongate wood pieces" is not intended to refer to the small, laterally-oriented pieces of wood which are traditionally cut and assembled for individual tiles. The elongate wood pieces referred to herein are longitudinally oriented (e.g., perpendicular to each tile surface). The term "elongate" refers to a longitudinal length which is equal to a plurality of tile thicknesses.

Figure 2:
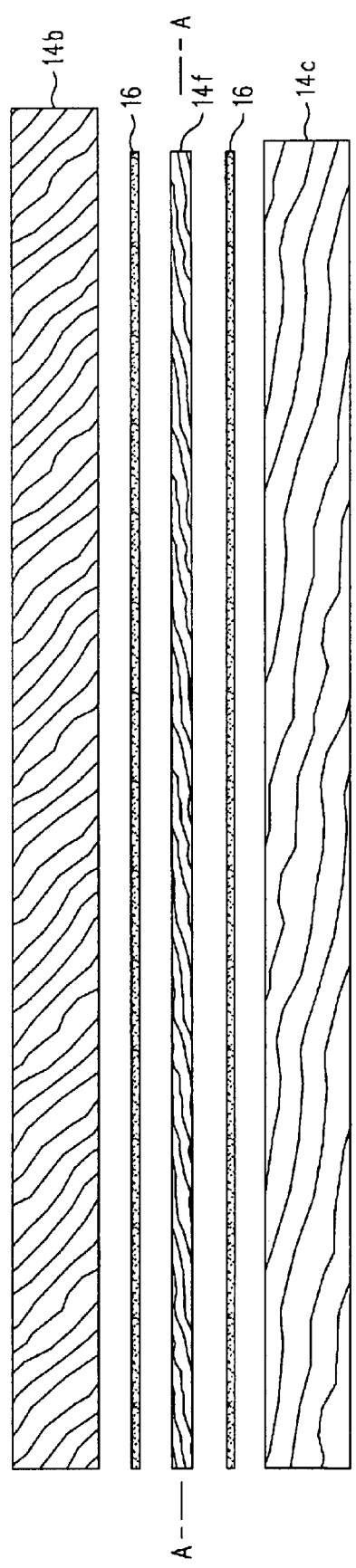
FIG. 2 is an exploded side view of a plurality of elongate wood pieces with adhesive layers therebetween.

As best shown in FIG. 2, in one embodiment of the invention, a plurality of pre-finished elongate wood pieces 14a–g (elongate wood piece 14e is not shown for clarity) are assembled in a longitudinal orientation along axis AA, which is generally perpendicular to each tile surface (e.g., 30, FIG. 1). The elongate wood pieces 14a–g are securely adhered together using a standard adhesive 16 such as polyvinyl acetate ("PVA") or polyurethane ("PUR") adhesives. The adhesive 16 is allowed to cure in a manner well-known in the art, thereby forming the elongate composite beam 12, FIG. 3, having a first end 18 and a second end 20. Subsequently, the beam 12 is cross-sectionally sliced using standard wood cutting tools into individual tiles 10 as indicated by dashed lines in FIG. 3.

The elongate composite beam 12 shown in FIG. 1 has a rectangular cross-sectional shape which is the most preferable shape for tiles, whereby "rectangular" as used in the present application includes "square". Prior to assembling and adhering the elongate wood pieces 14a–f, the elongate wood pieces are individually machined and pre-finished to specific tolerances so that, when assembled, a beam 12 is formed with the desired rectangular cross-sectional shape. The beam 12 may have a height "H1" and a width "W1" and may be sliced a thickness "T1" in order to produce tiles 10 having a front surface 30 and a rear surface 32, either of which may be the front or "wearing" surface of the tile since these surfaces 30, 32 are substantially identical. Since the tiles are sliced cross-sectionally, i.e., perpendicularly to any elongate major (i.e., non-end) surface 22, 24, 26, 28 on the beam, a uniform thickness "T1", the shape of each surface 30, 32 is the same as the cross-sectional shape of the beam. The dimensions "H1 by W1" of each tile 10 may be a standard tile size such as 4 inches by 4 inches, 6 inches by 6 inches, 12 inches by 12 inches, 6 inches by 8 inches, etc. The thickness "T1" of each tile 10 is also preferably a standard tile thickness which can range from approximately ¹⁄₃₂ inch to ¾ inch, or most preferably approximately ¼ inch to ½ inch.

By slicing the tiles 10 from the elongate composite beam 12, the surface 30 of each of the resulting tiles 10 are substantially comprised of end grain wood, which is known in the art as being superior to flat grain wood as noted above. Since the elongate wood pieces are pre-assembled and pre-adhered, with the adhesive being allowed to cure prior to slicing the tiles from the beam, the resulting tiles are far more stable than tiles created using traditional methods. Thus, while the wooden tiles of the present invention are ideal for use as floor tiles (i.e., parquetry), the wooden tiles of the present invention may be utilized in any decorative tile application such as marquetry, wall or ceiling tiles, or the like.

Figure 3:
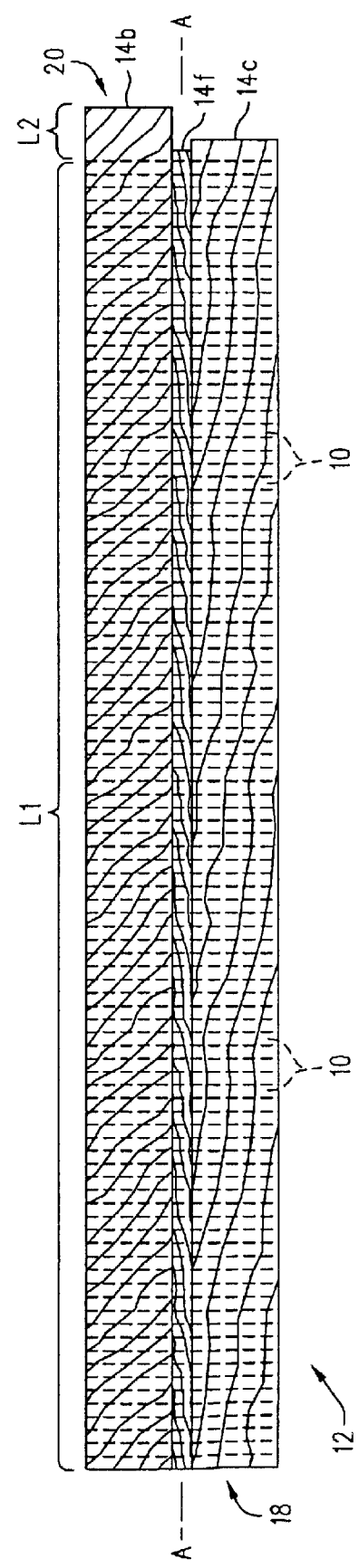
FIG. 3 is a side view of an elongate composite beam and wooden tiles sliced therefrom shown in dashed lines.

While a particular surface pattern and elongate wood pieces are shown in FIGS. 1–3, it can be appreciated that any combination of elongate wood pieces may be utilized in the present invention to create an infinite variety of surface patterns. Specifically, the elongate wood pieces may be comprised of any combination of wood beams, boards, planks, laminate, veneer, or the like having any width and height dimensions. The elongate wood pieces may be any longitudinal length, and the individual elongate wood pieces (e.g., 14b, c, f, FIG. 3) need not be the same length. As noted above, the term "elongate" as used herein refers to a longitudinal length which is equal to at least several times the thickness "T1", FIG. 1 of each tile 10, and most preferably one to six feet (or longer, if weight of the beam is not an issue). The usable longitudinal length "L1", FIG. 3, of the beam 12 is the length of beam which may be sliced into tiles 10, which is usually slightly less than the length of the shortest piece of wood 14f as shown in FIG. 3. The remaining length "L2" of beam 12, if any, is scrap. When the elongate wood pieces 14a–g are assembled to form the beam 12, the elongate wood pieces 14a–g are preferably aligned on at least one end 18 of the beam (which is the end from which the first tile is sliced) as shown in FIG. 3. To minimize the amount of scrap, it is most preferable to use elongate wood pieces 14a–g having the same length. The usable length "L1" of the beam 12 and the desired thickness "T1" (FIG. 1) of each tile determines how many tiles 10 may be sliced from a single beam 12. For example, if ¼ inch tiles are sliced from a beam with a usable length of approximately 4 feet, then up to 192 tiles may be produced from the beam. It can be appreciated that in order to manually assemble 192 tiles, even with the simplest parquet surface pattern, would be considerably more time-consuming and labor-intensive. It is estimated that the method of the present invention produces tiles 75% more efficiently than any standard method involving assembling individual tiles, with the rate of efficiency being higher as more tiles are produced from a single beam. This is due to the fact that the elongate wood pieces of the present invention need only be assembled and adhered once in order to produce a plurality of tiles from a single beam. With standard methods, the small, laterally-oriented wood pieces must be separately assembled and adhered for each individual tile.

A variety of different species of wood may be utilized in the elongate composite beam 12 to create different surface patterns on the wooden tiles 10. For example, FIG. 1 shows four generally rectangular elongate wood pieces 14a–d which may be, for example, a light-colored wood such as maple, sandwiching three pieces 14e–g of darker wood such as, for example, walnut. The tiles 10 may be finished on the "wearing" surface (e.g. front surface 30) by lightly sanding the surface 30 to provide a smooth surface and to bring each tile to an even thickness. A clear polyurethane varnish may then be applied to the surface 30 of each tile 10, which generally has the effect of bringing out the beauty of most wood, especially end grain wood. For example, end grain walnut becomes nearly black when coated with a clear varnish, while ash and maple become almost pure white. Exotic woods such as purple heart and padauk have very interesting colors and patterns which emerge when clear varnish is applied to their end grain surfaces. To provide different color combinations, a tinted varnish or stain and clear varnish may be applied to each of the tiles 10. Finally, an adhesive backing may be applied to the surface (e.g., the rear surface 32) opposite the "wearing" surface of each tile 10 to create a self-adhesive tile which is designed to be installed by a home owner and is commonly sold at "do-it-yourself" home improvement centers.

Figure 4:
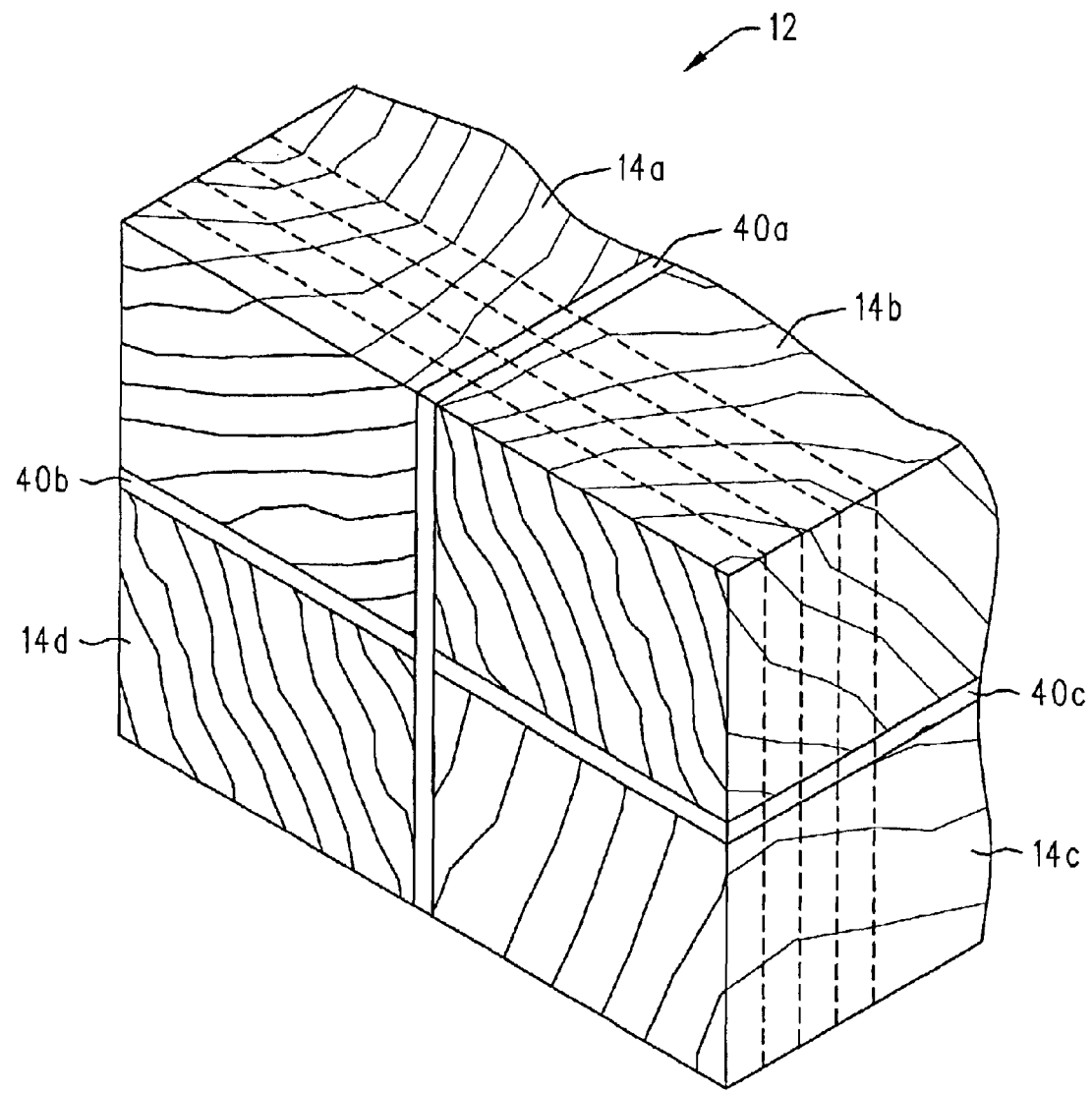
FIG. 4 is an isometric view of an elongate composite beam having very thin wood or non-wood products therein.

In another embodiment of the invention shown in FIG. 4, one or more elongate pieces of non-wood product 30a–c may be assembled and adhered along with elongate wood pieces 14a–d, thereby producing a tile which is primarily end grain wood with an "inlay". The non-wood product is preferably slicable using standard wood cutting tools such as a bandsaw, cross cut saw, or the like so that special tools need not be used to slice the tiles. This may be accomplished by using very thin sheets of non-wood product such as, for example, brass, aluminum, an acrylic polymer blend (e.g., "Corian"), or any material desirable for use in a particular tile application (floor, ceiling, etc.). These sheets of non-wood product may be, for example, as thin as approximately ⅟50 inch, or as thick as approximately ¾ inch.

Alternatively, any or all of the "inlay" pieces 30a–c described above may be very thin elongate wood pieces such as laminate or veneer. For example, these thin wood pieces may be comprised of exotic wood such as purple heart or padauk, thereby providing a tile with an expensive-looking inlay for very little cost. It can be appreciated that, if it were even possible to manually produce a tile with such an "inlay" using prior art methods, it would be extremely difficult to manually assemble the small, laterally-oriented wood pieces and the very thin wood or non-wood pieces into a tile. Thus, the present invention provides a method to mass-produce tiles having intricate patterns and/or thin inlays.

FIGS. 5–10 show some of the infinite variety of patterns which can be created using the method of the present invention (the wood grain surface pattern was removed from these figures for clarity). Most, if not all, of these patterns would be very time-consuming and labor-intensive to create using prior art methods.

Figure 5:
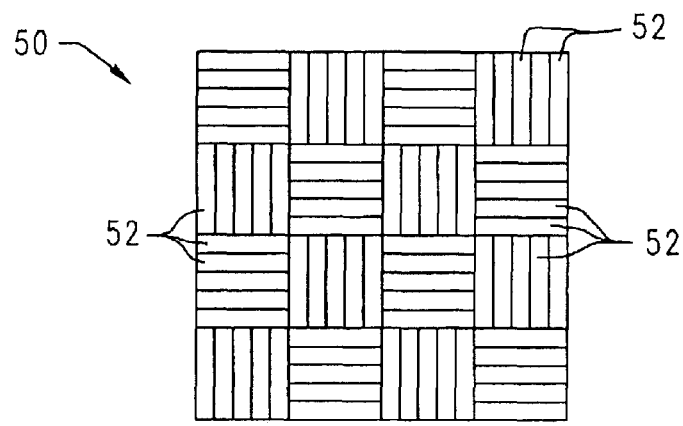
FIGS. 5–10 are front views of wooden tiles produced by the method of the present invention.

FIG. 5 illustrates a standard parquet tile 50 created using the method of the present invention. This tile 50 may be made using a plurality of elongate wood pieces, e.g., 52, arranged in an alternating lateral orientations as shown. The elongate wood pieces 52 may be substantially identical, or, alternately, the elongate wood pieces 52 may be comprised of different species of wood as discussed above in order to create a multi-colored tile. Also as discussed above, since the longitudinally-oriented elongate wood pieces 52 are assembled and adhered together prior to slicing the tiles, the parquet tile 50 of the present invention is much more stable and durable than standard parquet tiles which are comprised of small, laterally-oriented wood pieces that are assembled and adhered together for each individual tile. In addition, it can be appreciated that the amount of time required to assemble eighty or so small, laterally-oriented wood pieces into the parquet tile 50 using standard methods would be considerable. However, with the present invention, the eighty or so elongate wood boards or planks 52 need only be arranged and adhered once in order to produce a plurality of tiles. In addition, the surface pattern would be much more consistent utilizing the method of the present invention since a plurality of tiles are sliced from a single elongate beam.

Figure 6:
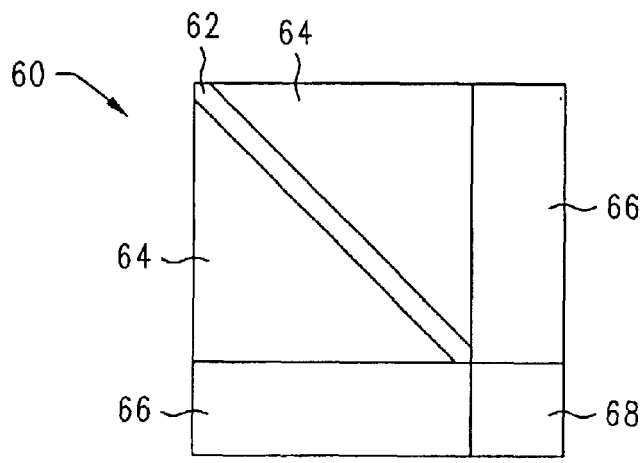

FIG. 6 illustrates a tile 60 which is asymmetrical and is comprised of a horizontally-oriented elongate piece of wood or non-wood product 62, triangular-shaped elongate wood pieces 64, rectangular elongate wood pieces 66, and a square wood piece 68.

Figure 7:
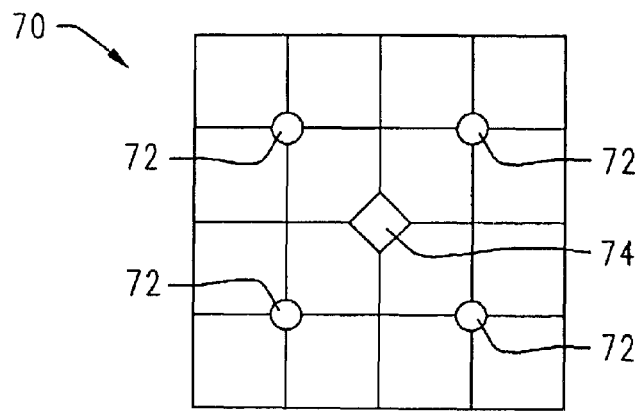

FIG. 7 illustrates a tile 70 which has round and diamond-shaped inlays. These inlays may be comprised of cylindrical, elongate wood or non-wood dowels 72 and a rectangular (including square) elongate piece of wood or non-wood product 74 which is rotated as shown to create a diamond-shaped inlay.

Figure 8:
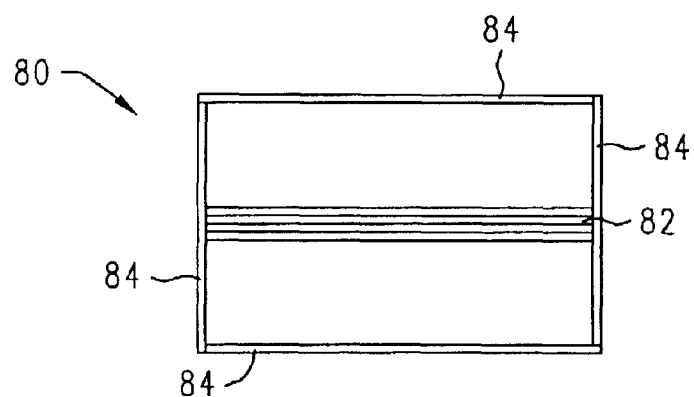

FIG. 8 illustrates a tile 80 having a "striped" appearance which may be created either by using an elongate piece 82 of plywood or, alternatively, several elongate wood pieces sandwiched together. Thin pieces of wood or non-wood product 84 may be arranged on the major surfaces 22, 24, 26, 28 of the beam 12 as shown in order to create a "border" effect on the tile 80.

Figure 9:
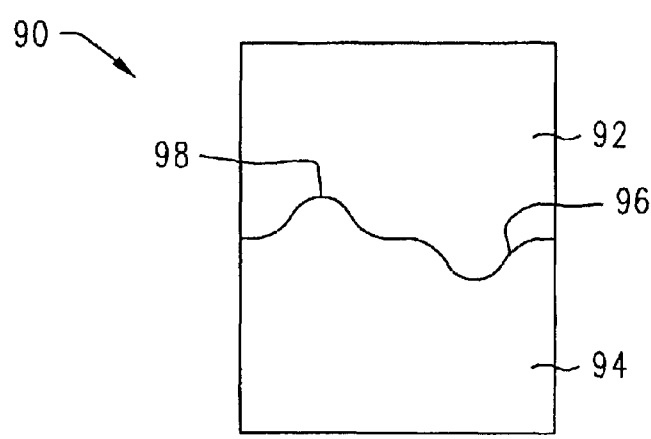

FIG. 9 illustrates a tile 90 which may be created by using elongate wood pieces, e.g., 92, 94, which have been finished on one side thereof with a molder or the like, creating curved edges, e.g., 96, 98. One curved edge, e.g., 96, may be created using a "female" milling head, while the other curved edge, e.g., 98 may be created by using an opposite, or "male" milling head. It can be appreciated that this method can create many "flower petal-type" designs as shown in FIG. 9.

Figure 10:
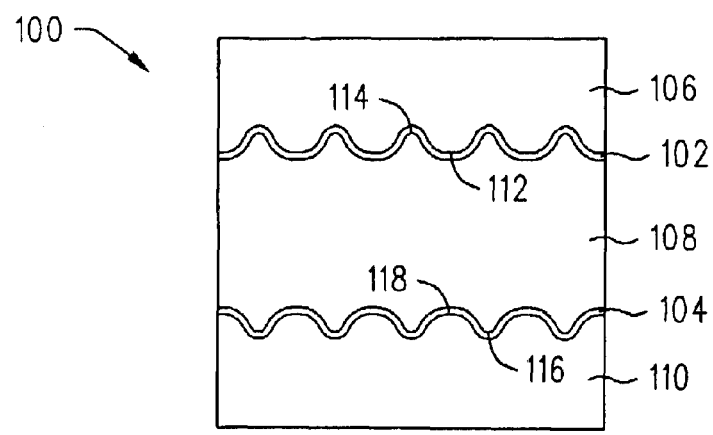

FIG. 10 illustrates a tile 100 having thin, curved, elongate pieces 102, 104 of wood or non-wood product sandwiched between thicker elongate wood pieces 106, 108, 110. Such a tile 100 may be created by first cutting curved edges 112, 114, 116, 118 into the thicker elongate wood pieces 106, 108, 110 using a molder or the like. Then, a thin, flexible, elongate sheet of laminate, veneer, or non-wood product 102, 104 may be pressed onto and adhered to one of the curved edges 112, 114, 116, 118. An adjoining elongate wood piece is then adhered to the laminate, etc. It will be appreciated by those skilled in the art that creating tiles with curved thin, curved details as shown in FIG. 10 would be extremely time-consuming and cost-prohibitive using standard methods, while the method of the present invention makes it rather easy to create a tile with such curved wood or non-wood details.

While specific surface patterns are shown in FIGS. 1–10 and described above, it is to be understood that the method of present invention is capable of producing an infinite variety of surface patterns. Furthermore, any of these patterns may be altered by utilizing different elongate wood pieces and/or pieces of non-wood product, different species of wood, different colored stains, etc.

Figure 11:
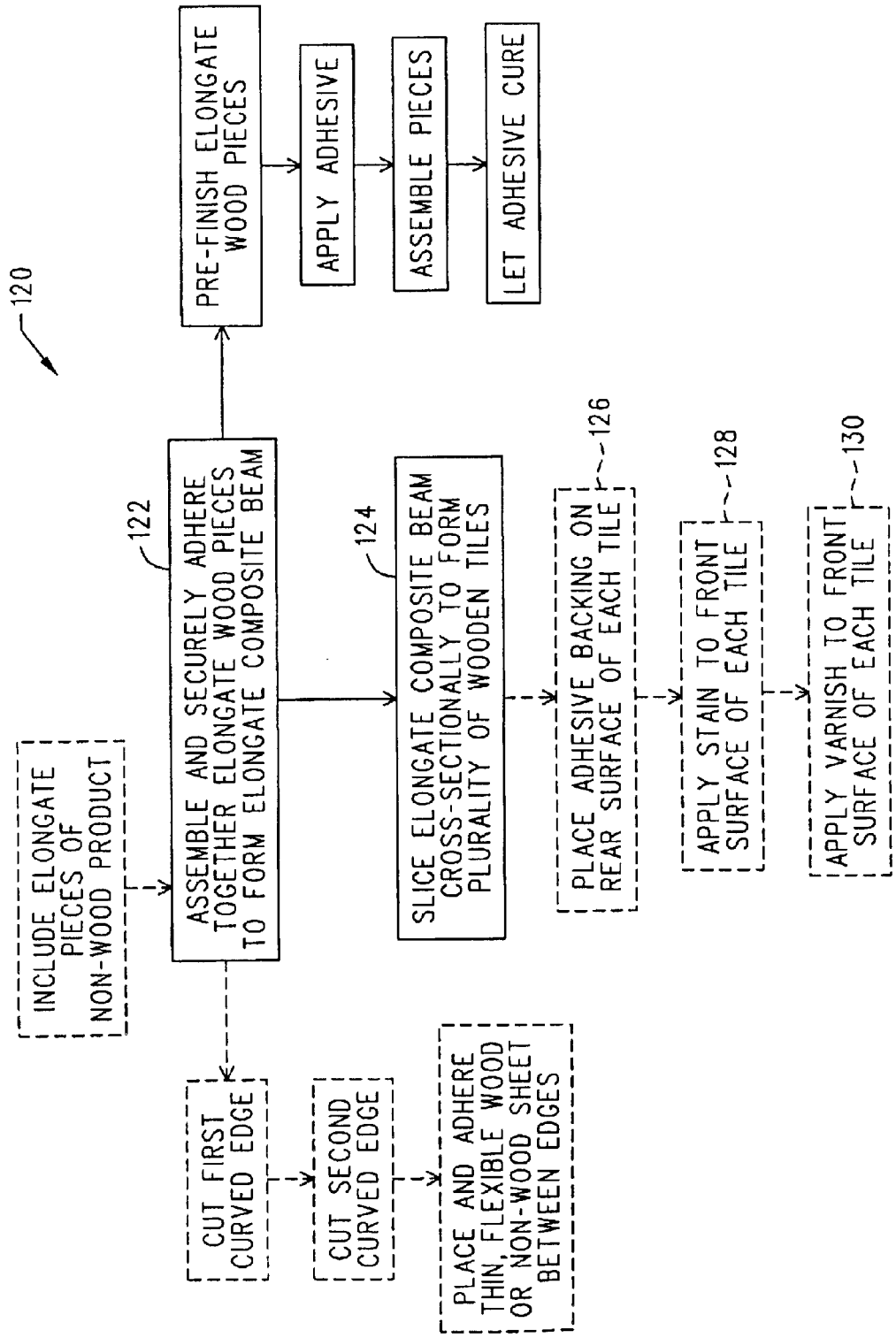
FIG. 11 is a flow chart illustrating a method for making a plurality of wooden tiles from an elongate composite beam.

FIG. 11 is a flow chart illustrating a method 120 for making a plurality of wooden tiles from an elongate composite beam. With reference also to FIGS. 1–10, the method 120 comprises the initial step 122 of assembling and securely adhering together a plurality of elongate wood pieces (e.g., 14a–g, FIGS. 1–3) to form the elongate composite beam 12 having a rectangular (including square) cross-sectional shape. As indicated by dashed lines, one or more elongate pieces of non-wood product (e.g., 40a–c, FIG. 4) may also be assembled and adhered along with the elongate wood pieces as desired. This step 122 may involve pre-finishing (e.g., cutting and sanding) each of the elongate wood pieces (e.g., 14a–g) within a predetermined tolerance such that, when assembled, the elongate wood pieces and non-wood piece(s), if included, form the elongate composite beam 12 having the desired rectangular (including square) shape. Next, an adhesive 16 is applied to some or all of the elongate wood pieces (and may be applied to the non-wood piece(s), if desired) in order to securely adhere the pieces together. Then, the elongate wood pieces (e.g. 14a–g) and non-wood piece(s), if included, are assembled as demonstrated in FIGS. 1–4 to form the elongate composite beam 12. The adhesive 16 is allowed to completely cure prior to the next step 124, which involves slicing the elongate composite beam 12 cross-sectionally to form the plurality of wooden tiles 10. The beam 12 is sliced using standard wood cutting tools so that each tile has a predetermined, substantially uniform tile thickness "T1". Any small variances in the thickness of the tile may be remedied to a uniform thickness when each tile is lightly sanded as discussed above. The tiles 10 are cross-sectionally sliced from the beam 12 so that each tile has the same rectangular (including square) cross-sectional shape as the beam, with a front surface 30 and a rear surface 32. Each of the front and rear surfaces 30, 32 is substantially comprised of end grain wood, but also may be comprised of non-wood products as discussed above.

In order to create a tile having thin, curved pieces of wood or non-wood product therein as shown in FIG. 10, the step 122 may alternately comprise the following actions. First, a first curved edge (e.g. 112) is cut into a surface on a first one (e.g., 106) of the elongate wood pieces. Then, a second curved edge (e.g., 114) is cut into a surface on a second one (e.g., 108) of the elongate wood pieces. These edges are cut by opposite (male-female) milling heads so that the edges 112, 114 mesh together. Then, a thin, flexible, elongate sheet of wood or non-wood product (e.g., 102) is placed and adhered between the first and second edges 112, 114.

The method 120 may further comprise the step 126 of placing an adhesive backing on the rear surface 32 of each of the wooden tiles 10 to produce a plurality of self-adhesive wooden tiles. The method 120 may further comprise the step 128 of applying a stain and/or the step 130 of applying a varnish to the front surface 30 of each of the wooden tiles 10.

Referring now to FIGS. 12–18, the present invention is also directed to a unique method for making a plurality of wooden boards 210 from an elongate composite block 212. It is to be understood that, unless stated otherwise below, all of the information discussed above relative to the tiles 10, FIGS. 1–11, also applies to the wooden boards 210 described below.

Figure 12:
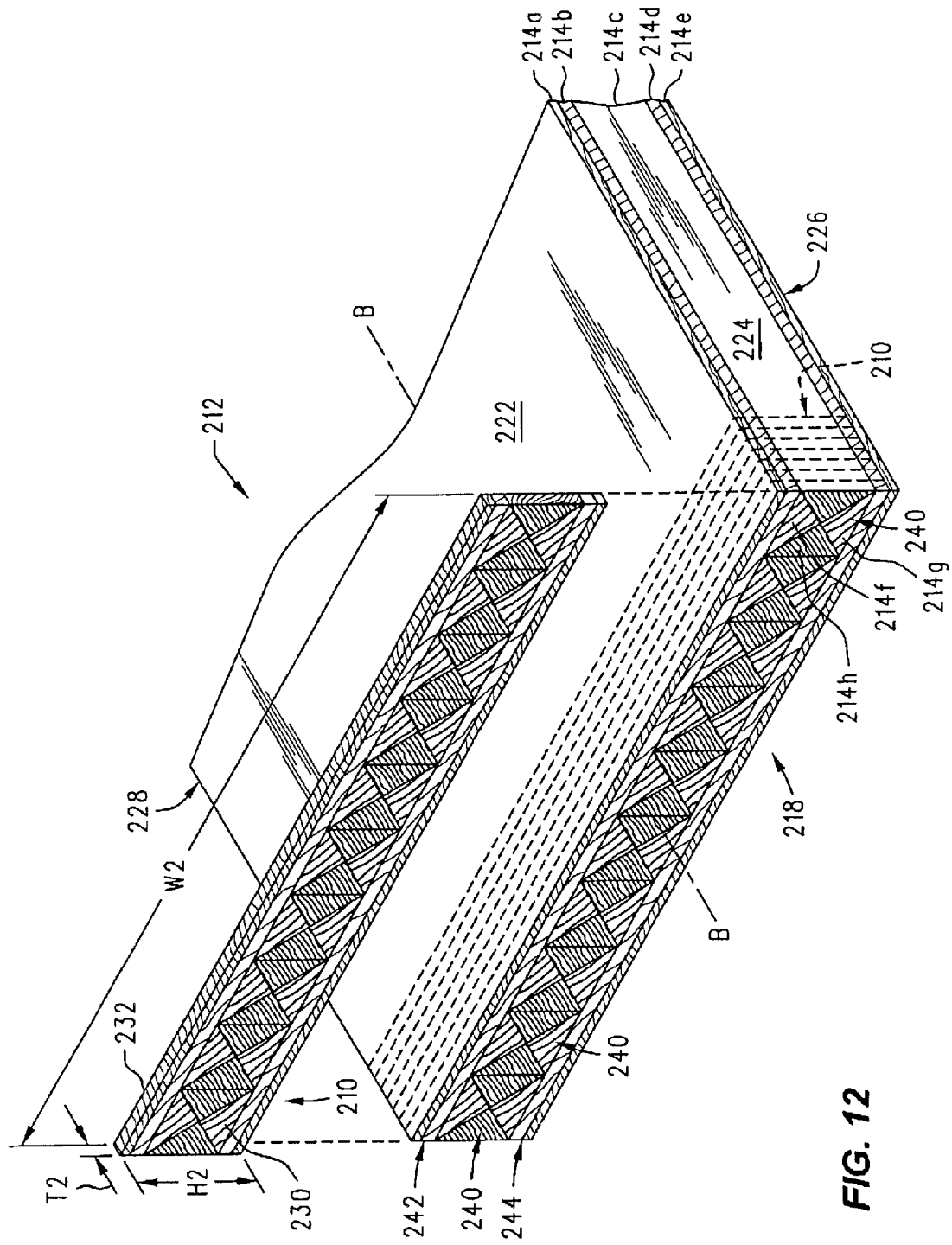
FIG. 12 is an isometric view of an elongate composite block and wooden board sliced therefrom.

As shown in FIG. 12, the elongate composite block 212 is made up of pre-assembled and pre-adhered elongate wood beams, boards, laminate, veneer, or the like (e.g., 214a–h). As previously noted, the elongate wood beams, boards, planks, laminate, veneer, or the like will be hereinafter referred to collectively as "elongate wood pieces". The term "elongate wood pieces" is not intended to refer to the small, laterally-oriented pieces of wood which are traditionally cut and assembled for individual tiles and boards. The elongate wood pieces referred to herein are longitudinally oriented (e.g., perpendicular to each board surface). The term "elongate" refers to a longitudinal length which is equal to a plurality of boards thicknesses.

As noted above with reference to FIG. 2, a plurality of pre-finished elongate wood pieces (e.g., 214a–h) may be assembled in a longitudinal orientation along axis BB, FIG. 12, which is generally perpendicular to the surface (e.g., 230) of each board 210. The elongate wood pieces 214a–h, etc., are securely adhered together using a standard adhesive (not shown in FIG. 12, but see adhesive 16 in FIG. 2) such as polyvinyl acetate ("PVA") or polyurethane ("PUR") adhesives. The adhesive is allowed to cure in a manner well-known in the art, thereby forming the elongate composite block 212 having a first end 218 and a second end (not shown). As is known in the art, the adhesive may be allowed to cure while the block 212 (or beam 12, discussed above) is subjected to compressive pressure utilizing, for example, standard wood clamps, pneumatic clamps, hydraulic clamps, or the like. Subsequently, the block 212 is cross-sectionally sliced using standard wood cutting tools into individual boards 210 as indicated by dashed lines in FIG. 12.

The elongate composite block 212 shown in FIG. 12 has a relatively long, thin rectangular cross-sectional shape which is the most preferable shape for boards 210 such as flooring planks, wall panels, trim, molding, and the like. Thus, the terms "board" and "wooden board" as used herein are defined as a relatively long, thin, rectangular product that is mostly or entirely composed of wood, including flooring planks, wall panels, trim, molding, and the like. Prior to assembling and adhering the elongate wood pieces 214a–h, etc., the elongate wood pieces are individually machined and pre-finished to specific tolerances so that, when assembled, the block 212 is formed with the desired rectangular cross-sectional shape. The block 212 and each board 210 cut therefrom may have a width "W2" and a height "H2", wherein the width is substantially longer than the height. For example, standard dimensions for flooring planks or wall panels may include a width "W2" of between about 24 inches and 48 inches and a height "H2" of between about 3 inches and 8 inches. Standard dimensions for trim include a width "W2" of between about 36 inches and 60 inches and a height "H2" of between about ¾ inch and 2 inches. Standard dimensions for molding may include a width "W2" of between about 72 inches and 196 inches and a height "H2" of between about 2 inches and 8 inches. It is to be understood that the above dimensions are merely exemplary and are presented to definitively explain the meaning of the above statement "wherein the width is substantially longer than the height".

The block 212 may be sliced a thickness "T2" in order to produce boards 210 having a front surface 230 and a rear surface 232, either of which may be the front or "wearing" surface of the board since these surfaces 230, 232 are identical. Since the boards are sliced cross-sectionally, i.e., perpendicularly to any elongate major (i.e., non-end) surface 222, 224, 226, 228 on the block, a uniform thickness "T2", the shape of each surface 230, 232 is the same as the cross-sectional shape of the block 212. The thickness "T2" of each board 210 may be a standard board thickness which can range from approximately 1/32 inch to ¾ inch, or most preferably approximately ¼ inch to ½ inch.

As shown in FIG. 12, each board 210 may have a predetermined, repeating and/or continuous decorative pattern thereon. The board 210 may have one or more repeating pattern portions 240 which are duplicated along the width "W2" of the board 210 and block 212. One of the repeating pattern portions 240 on the board 210 shown in FIG. 12 is composed of wood pieces 214c, 214f, 214g, and 214h. The board 210 may also, or alternately, have one or more continuous pattern portions 242, 244 which continuously runs along the width "W2" of the board 210 and block 212. One of the continuous pattern portions 242 shown in FIG. 12 is composed of wood pieces 214a and 214b, and another of the continuous pattern portions 244 shown in FIG. 12 is composed of wood pieces 214d and 214e.

While a particular decorative surface pattern and elongate wood pieces are shown in FIGS. 12–15 and 17, it can be appreciated that, as noted above relative to the tiles 10, any combination of elongate wood pieces may be utilized in the present invention to create an infinite variety of decorative surface patterns. Specifically, the elongate Wood pieces may be comprised of any combination of wood beams, boards, planks, laminate, veneer, or the like having any width and height dimensions. The elongate wood pieces may be any longitudinal length, and the individual elongate wood pieces (e.g., 214a–h, etc., FIG. 12) need not be the same length. As noted above, the term "elongate" as used herein refers to a longitudinal length which is equal to at least several times the thickness "T2" of each tile 210, and most preferably one to six feet (or longer, if weight of the block is not an issue). As described above with regard to the elongate beam 12, FIG. 3, the usable longitudinal length of the block (e.g., 212, FIG. 12) is the length of block which may be sliced into boards 210, which is usually slightly less than the length of the shortest piece of wood. The remaining length of block 212, if any, is scrap. When the elongate wood pieces e.g., 214a–h, etc., are assembled to form the block 212 as shown in FIG. 12, the elongate wood pieces 214a–h, etc. are preferably aligned on at least one end 218 of the block (which is the end from which the first board 210 is sliced) as shown in FIG. 12. To minimize the amount of scrap, it is most preferable to use elongate wood pieces 214a–h, etc. having the same length. The usable length of the block 212 and the desired thickness "T2" of each board 210 determines how many boards 210 may be sliced from a single block 212, as noted above with regard to the tiles 10 sliced from the beam 12, FIGS. 1–3.

Also as noted above with regard to the tiles 10 sliced from the beam 12, a variety of different species of wood may be utilized in the elongate composite block (e.g., 212, FIG. 12) to create different decorative surface patterns on the wooden boards 210. For example, the elongate wood pieces may be composed of dark to light wood, exotic wood, hardwood, plywood, etc. Furthermore, any of the decorative patterns shown in FIGS. 1 and 4–10 may be modified to create a board 210 with one or more repeating pattern portions (e.g., 240, FIG. 12) and/or one or more continuous pattern portions (e.g., 242, 244, FIG. 12).

The boards 210 may be finished on the "wearing" surface (e.g., front surface 230) by lightly sanding the surface 230 to provide a smooth surface and to bring each board to an even thickness. A clear polyurethane varnish may then be applied to the surface 230 of each board 210, which generally has the effect of bringing out the beauty of most wood, especially end grain wood as noted above. To provide different color combinations, a tinted varnish or stain and clear varnish may be applied to each of the boards 210. Finally, an adhesive backing may be applied to the surface (e.g., the rear surface 232) opposite the "wearing" surface of each board 210 to create a self-adhesive board which is designed to be installed by a home owner and is commonly sold at "do-it-yourself" home improvement centers.

Furthermore, as noted above, one or more elongate pieces of non-wood product (e.g., 30a–c, FIG. 4) may be assembled and adhered along with elongate wood pieces 214a–h, etc., thereby producing a board 210 with an "inlay". The non-wood product is preferably slicable using standard wood cutting tools such as a bandsaw, cross cut saw, or the like so that special tools need not be used to slice the boards 210. This may be accomplished by using very thin sheets of non-wood product such as, for example, brass, aluminum, an acrylic polymer blend (e.g., "Corian"), or any material desirable for use in a particular application (flooring, trim, etc.). These sheets of non-wood product may be, for example, as thin as approximately 1/50 inch, or as thick as approximately ¾ inch.

Alternatively, any or all of the "inlay" pieces described above may be very thin elongate wood pieces such as laminate or veneer. For example, these thin wood pieces may be comprised of exotic wood such as purple heart or padauk, thereby providing a board with an expensive-looking inlay for very little cost. It can be appreciated that, if it were even possible to manually produce a board with such an "inlay" using prior art methods, it would be extremely difficult to manually assemble the small, laterally-oriented wood pieces and the very thin wood or non-wood pieces into a board. Thus, the present invention provides a method to mass-produce boards having intricate patterns and/or thin inlays.

Like the tiles 10 discussed above, by slicing the boards 210 from the elongate composite block 212, the surface 230 of each of the resulting boards 210 may be substantially comprised of end grain wood, which is known in the art as being superior to flat grain wood as noted above. Since the elongate wood pieces are pre-assembled and pre-adhered (often under pressure), with the adhesive being allowed to cure prior to slicing the boards from the block, the resulting tiles or boards are far more stable than tiles or boards created using traditional methods. More specifically, unlike tiles or boards created using traditional methods which often contain significant gaps between individual wood pattern pieces, very tight tolerances are achieved among the pattern pieces of wooden tiles or boards created using the methods discussed herein. Thus, while the wooden boards of the present invention are ideal for use in flooring, the wooden boards of the present invention may be utilized in any decorative board application.

Figure 13:
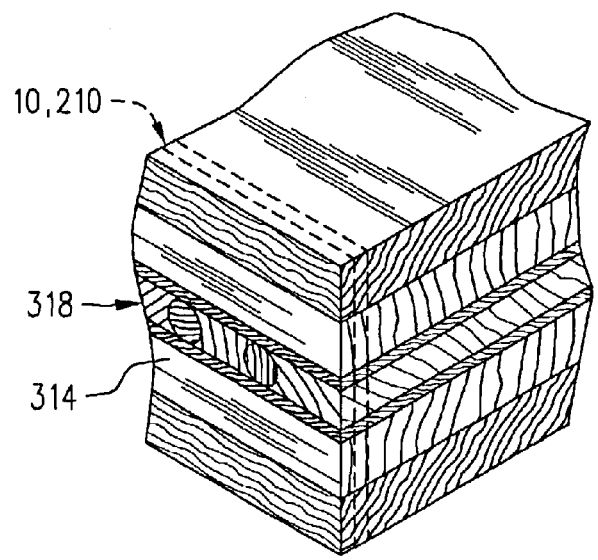
FIG. 13 is an isometric view of a portion of an elongate composite beam or block.
Figure 14:
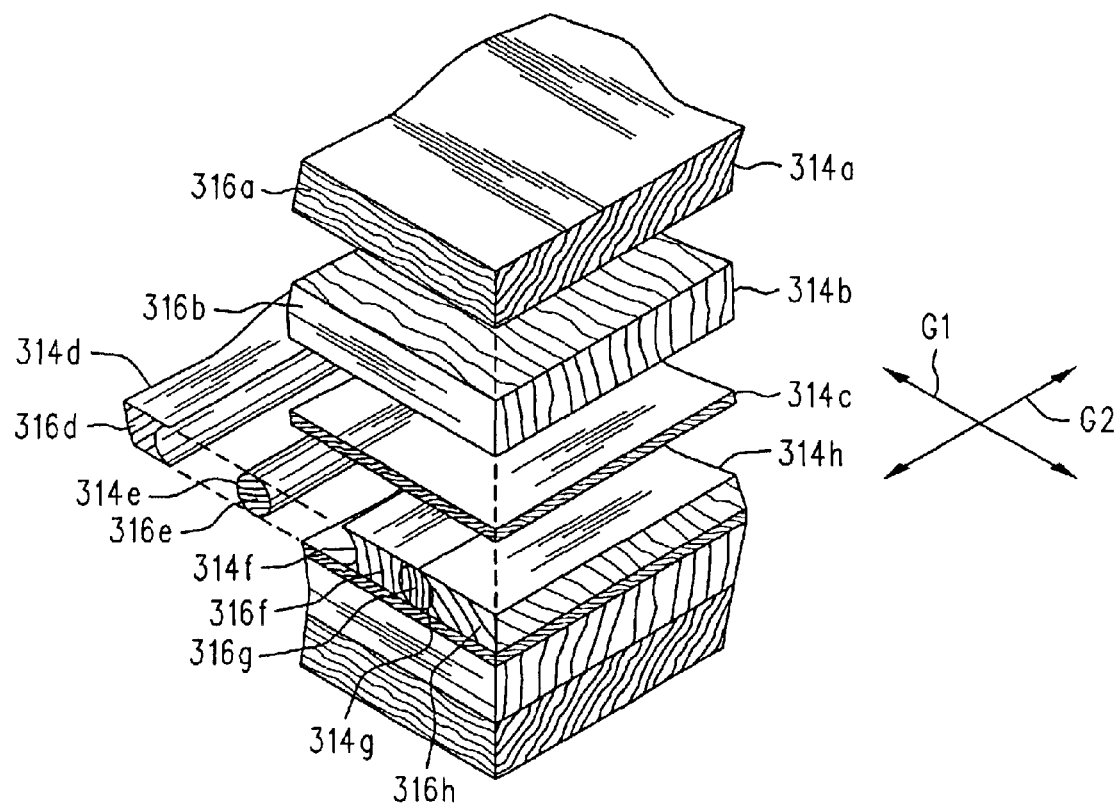
FIG. 14 is a partially exploded, isometric view of the portion of elongate composite beam or block of FIG. 13.

Alternatively, as shown in FIGS. 13 and 14, the elongate wood pieces 314a–h, etc., may be arranged such that each of the tiles 10 or boards 210 may have at least one surface (e.g., front surface 316) comprised of a combination of end grain wood and flat grain wood. More specifically, the exemplary pattern shown in FIGS. 13 and 14 indicates that one or more elongate wood pieces (e.g., 314a, 314b) may be oriented such that its front surface 316a may be comprised of flat grain wood. As indicated in FIG. 14, a flat grain wood pattern may be a relatively straight pattern such as that found on an edge (e.g., front surface 316a) of an elongate wood piece 314a, or a "cathedral" pattern such as that found on a flat surface (e.g., front surface 316b) of an elongate wood piece 314b. The elongate wood pieces (e.g., 314a, 314b) having flat grain wood on the surface (e.g., front surfaces 316a, 316b, respectively) are oriented in a first grain direction "G1", FIG. 14. In addition, one or more elongate wood pieces (e.g., 314c, 314d, 314e, 314f, and 314g) may be oriented such that its surface (e.g., front surface 316c, 316d, 316e, 316f, and 316g, respectively) may be comprised of end grain wood. The elongate wood pieces (e.g., 314c–g) having end grain wood on their surface (e.g., front surface 316c–g, respectively) are oriented in a second grain direction "G2", which is generally perpendicular to the first grain direction "G1", FIG. 14.

With a tile 10 or board 210 having one or more repeating pattern portions (e.g., 240, FIG. 12), the repeating pattern portion is preferably entirely end grain wood, especially when the repeating pattern portion is composed of elongate wood pieces (e.g., 214c, 214f, 214g, 214h, FIG. 12) having a geometric shape such as triangular, circular, rectangular (including square), or any shape that requires an elongate wood piece to be machined (see the shapes of elongate wood pieces 314f and 314h, for example). In particular, to create a particular shape in an elongate wood piece, it must be machined longitudinally, that is, along their longitudinal axis (parallel to "AA", FIG. 1, or "BB", FIG. 12). Thus, the surface (e.g., 30, 31, FIG. 1; 230, 232, FIG. 12) having a geometrical (or other) shape in its pattern would necessarily be comprised of end grain wood. However, a continuous pattern portion (e.g., 242, 244, FIG. 12) may be end grain wood or flat grain wood, since these elongate wood pieces (e.g., 214a, 214b, 214d, 214e, FIG. 12; 314a, 314b, FIG. 14) may be oriented in any manner and need not be machined into any particular shape.

Compared to tiles or boards having a surface comprised entirely of flat grain wood, tiles or boards comprised of a combination of end grain wood and flat grain wood are considerably more structurally stable as well as being very aesthetically pleasing. More specifically, the combination of the relatively bold pattern of end grain wood adjacent to the relatively subtle pattern of flat grain wood provides a very interesting pattern on the tiles or boards. In addition, the elongate wood pieces (e.g., 314c–g, FIG. 14) having end grain wood surfaces (e.g., 316c–g) may be arranged such that they form a design strip 318, FIG. 13, that can be sandwiched between elongate wood pieces (e.g., 314a–b) having flat grain wood surfaces (e.g., 316a–b) to produce an aesthetically pleasing design. Alternatively or in addition, elongate wood pieces having flat grain wood surfaces may be sandwiched between elongate wood pieces having end grain wood surfaces as desired to produce an aesthetically pleasing design. With regard to the structural stability of such tiles or boards, with reference to FIG. 14, utilizing elongate wood pieces 314a–314h, etc. oriented in grain directions "G1" and "G2" that are perpendicular to one another provides a structural stability that may be substantially greater than the structural stability of tiles or boards comprised of wood pieces having entirely a flat grain wood surface or entirely an end grain wood surface. In particular, the tendency of a tile or board to buckle and/or bow under a load applied thereto may be greatly reduced by utilizing elongate wood pieces having a combination of flat grain wood surfaces and end grain wood surfaces.

Figure 15:
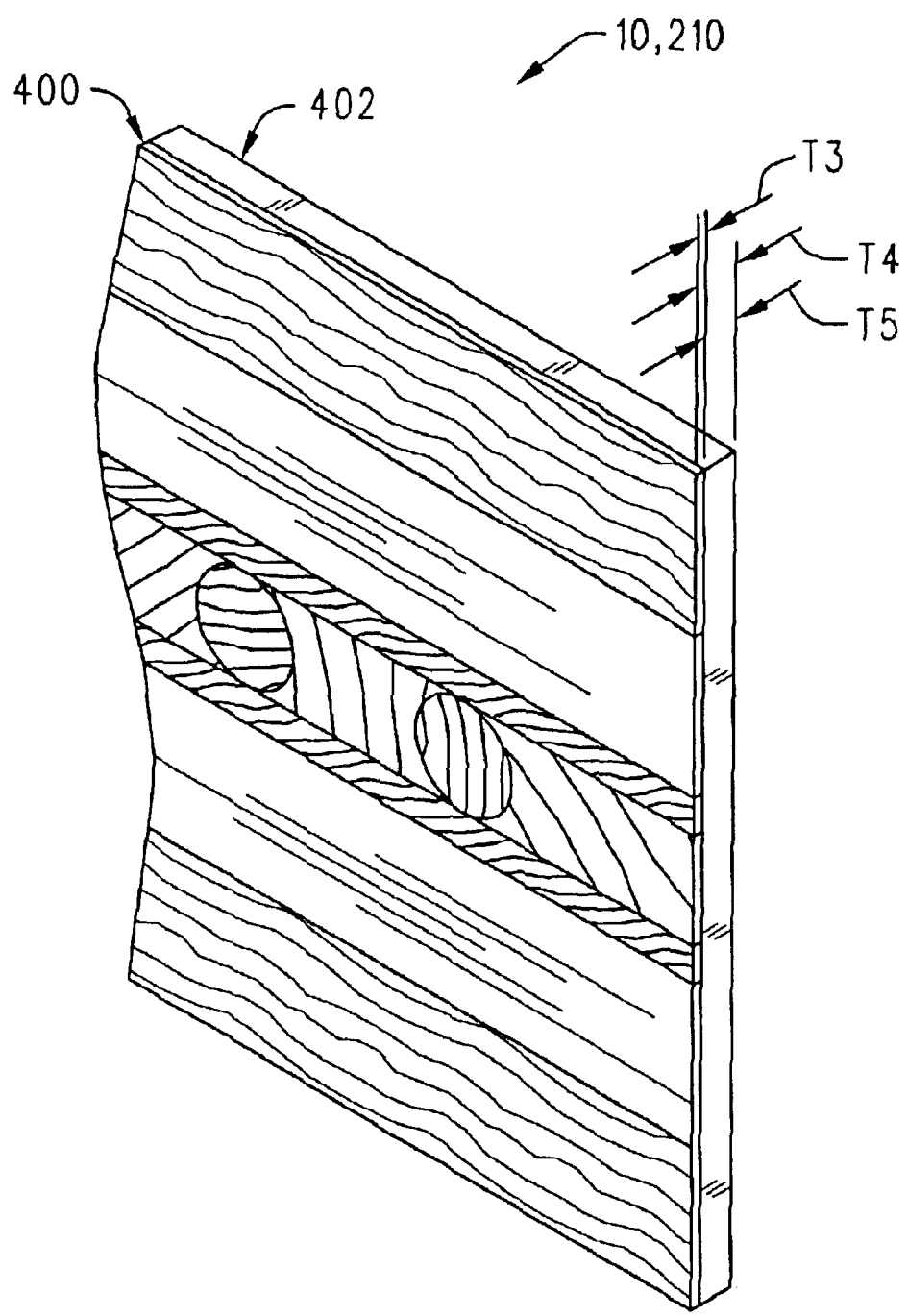
FIG. 15 is an isometric view of a portion of a tile or board produced with veneer.

In another embodiment shown in FIG. 15, the elongate beam or block may be sliced thinly to produce a veneer tile or board 400 having a thickness "T3" of between about 1/32 inch and 1/4 inch, which is a thickness commonly found with veneer. Each veneer tile or board 400 may then be attached to a relatively inexpensive piece of wood 402 such as plywood to produce a decorative tile 10 or board 210. The veneer tile or board 400 may be attached in any conventional manner. The piece of wood 402 may have a surface with a rectangular (including square) shape that is the desired shape of the decorative tile 10 or board 210 to be produced. The piece of wood 402 may have a thickness "T4" of between about 11/32 inch and 1/2 inch in order to produce decorative tiles 10 or boards 210 having a thickness "T5" if preferably between about 3/8 inch to 3/4 inch, and most preferably about 1/2 inch.

Figure 16:
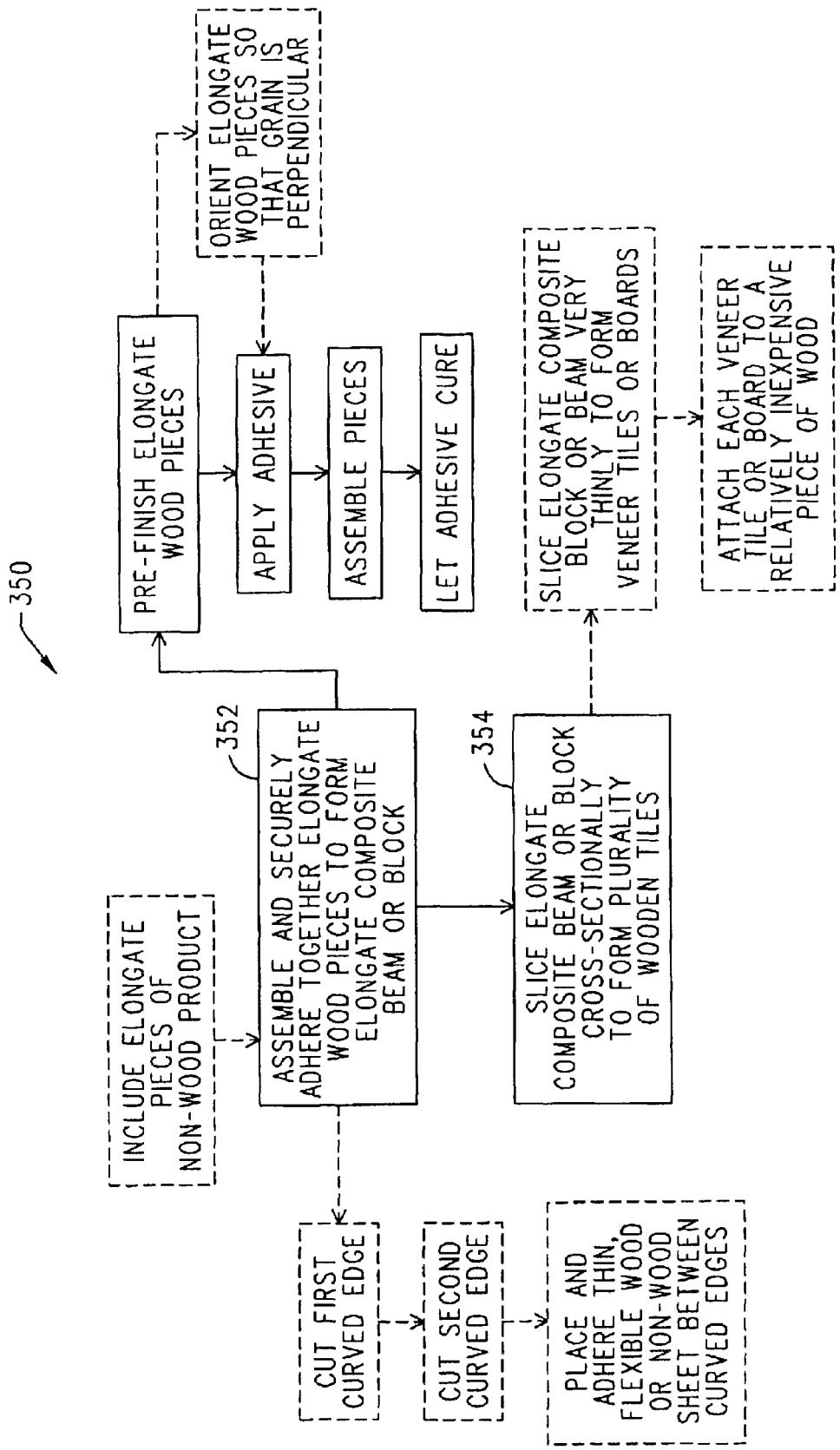
FIG. 16 is a flow chart illustrating a method for making a plurality of wooden tiles or boards from an elongate composite beam or block.

FIG. 16 is a flow chart illustrating a method 350 for making a plurality of wooden tiles or boards from an elongate composite beam. With reference also to FIGS. 1–15, the method 350 comprises the initial step 352 of assembling and securely adhering together a plurality of elongate wood pieces (e.g., 14a–g, FIGS. 1–3; 214a–g, FIG. 12; 314a–h, FIG. 14) to form the elongate composite beam 12 (FIGS. 1–3) or block 212 (FIG. 12) having a rectangular cross-sectional shape. The elongate wood pieces (e.g., 14a–g, FIGS. 1–3; 214a–g, FIG. 12; 314a–h, FIG. 14) are comprised of at least two different species of wood. As noted above, the rectangular cross-sectional shape of an elongate composite beam 12 (FIGS. 1–3) may be square, while the rectangular cross-sectional shape of an elongate composite block 212 (FIG. 12) may have a width "W2" and a height "H2", wherein the width is substantially longer than the height as shown in FIG. 12 and described above. As indicated by dashed lines, one or more elongate pieces of non-wood product (e.g., 40a–c, FIG. 4) may also be assembled and adhered along with the elongate wood pieces as desired.

This step 352, FIG. 16, may involve pre-finishing (e.g., cutting and sanding) each of the elongate wood pieces (e.g., 14a–g, FIGS. 1–3; 214a–g, FIG. 12; 314a–h, FIG. 14) within a predetermined tolerance such that, when assembled, the elongate wood pieces and non-wood piece(s) (e.g., 40a–c, FIG. 4), if included, form the elongate composite beam 12 or block 212 having the desired rectangular shape.

The elongate wood pieces having a grain direction "G1" or "G2" (FIG. 14) may be oriented such that the grain direction (e.g., "G1") of at least one of the elongate wood pieces is generally perpendicular to the grain direction (e.g., "G2") of at least another one of the elongate wood pieces in order to produce a decorative pattern comprising a combination of end grain wood and flat grain wood. An adhesive 16 (FIG. 2) may then be applied to some or all of the elongate wood pieces (and may be applied to the non-wood piece(s), if desired) in order to securely adhere the pieces together. Then, the elongate wood pieces (e.g., 14a–g, FIGS. 1–3; 214a–g, FIG. 12; 314a–h, FIG. 14) and non-wood piece(s) (e.g., 40a–c, FIG. 4), if included, are assembled to form the elongate composite beam 12 or elongate composite block 212. The adhesive 16 is allowed to completely cure prior to the next step 354, which involves slicing the elongate composite beam 12 or block 212 cross-sectionally to form the plurality of wooden tiles 10 or boards 210.

In order to create a tile or board having thin, curved pieces of wood or non-wood product therein as shown in FIG. 10, the step 352 may comprise the following actions. First, a first curved edge (e.g., 112, FIG. 10) is cut into a surface on a first one (e.g., 106) of the elongate wood pieces. Then, a second curved edge (e.g., 114) is cut into a surface on a second one (e.g., 108) of the elongate wood pieces. These edges are cut by opposite (male-female) milling heads so that the edges 112, 114, FIG. 10 mesh together. Then, a thin, flexible, elongate sheet of wood or non-wood product (e.g., 102) is placed and adhered between the first and second edges 112, 114.

Alternately or in addition, the step 352 may comprise slicing the elongate composite beam 12 or block 212 very thinly (a thickness "T3", FIG. 15) to form veneer tiles or boards 400, FIG. 15. Each of the veneer tiles or boards 400 may then be attached to a relatively inexpensive piece of wood 402 having the rectangular cross-sectional shape of the elongate composite beam 12 or block 212 to form the plurality of wooden tiles 10 or boards 210 described above.

In the next step 354, FIG. 16, the beam 12 or block 212 is sliced using standard wood cutting tools so that each tile or board has a predetermined, substantially uniform tile thickness (e.g., "T1", FIG. 1; "T2", FIG. 12; "T3", FIG. 15). Any small variances in the thickness of the tile or board may be remedied to a uniform thickness when each tile or board is lightly sanded as discussed above. The tiles 10 or boards 210 are cross-sectionally sliced from the beam 12 or block 212, respectively, so that each tile or board has the same rectangular (including square) cross-sectional shape as the beam 12 or block 212, respectively. Each tile 10 has at least one surface (front surface 30 and/or rear surface 32, FIG. 1) and each board 210 has a surface (front surface 230 and/or rear surface 232, FIG. 12) having a predetermined decorative pattern thereon which is substantially consistent among the wooden tiles 10 or boards 210. The decorative pattern may have at least one repeating pattern portion (e.g., 240, FIG. 12) and/or at least one continuous pattern portion (e.g., 242, FIG. 12). The surface (30, 32, FIG. 1; 230, 232, FIG. 12) is at least partially comprised of end grain wood, but also may be comprised of non-wood products and/or a combination of end grain wood and flat grain wood. After slicing the elongate composite beam 12 or block 212, each of the plurality of elongate wood pieces (e.g., 14a–g, FIGS. 1–3; 214a–g, FIG. 12; 314a–h, FIG. 14) substantially maintains its pre-assembled cross-sectional shape.

Figure 17:
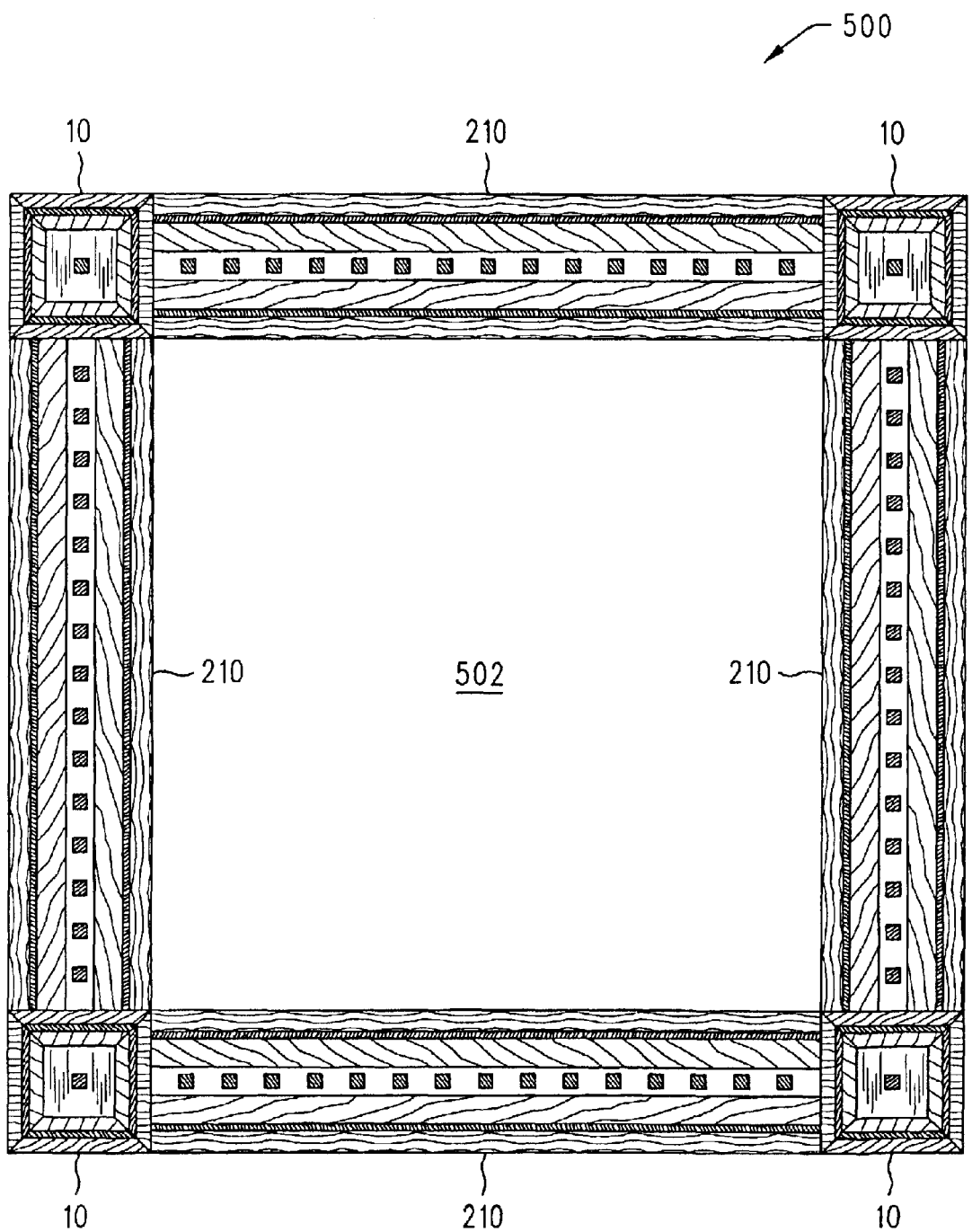
FIG. 17 is a top plan view of a border for a floor area using a combination of tiles and boards.
Figure 18:
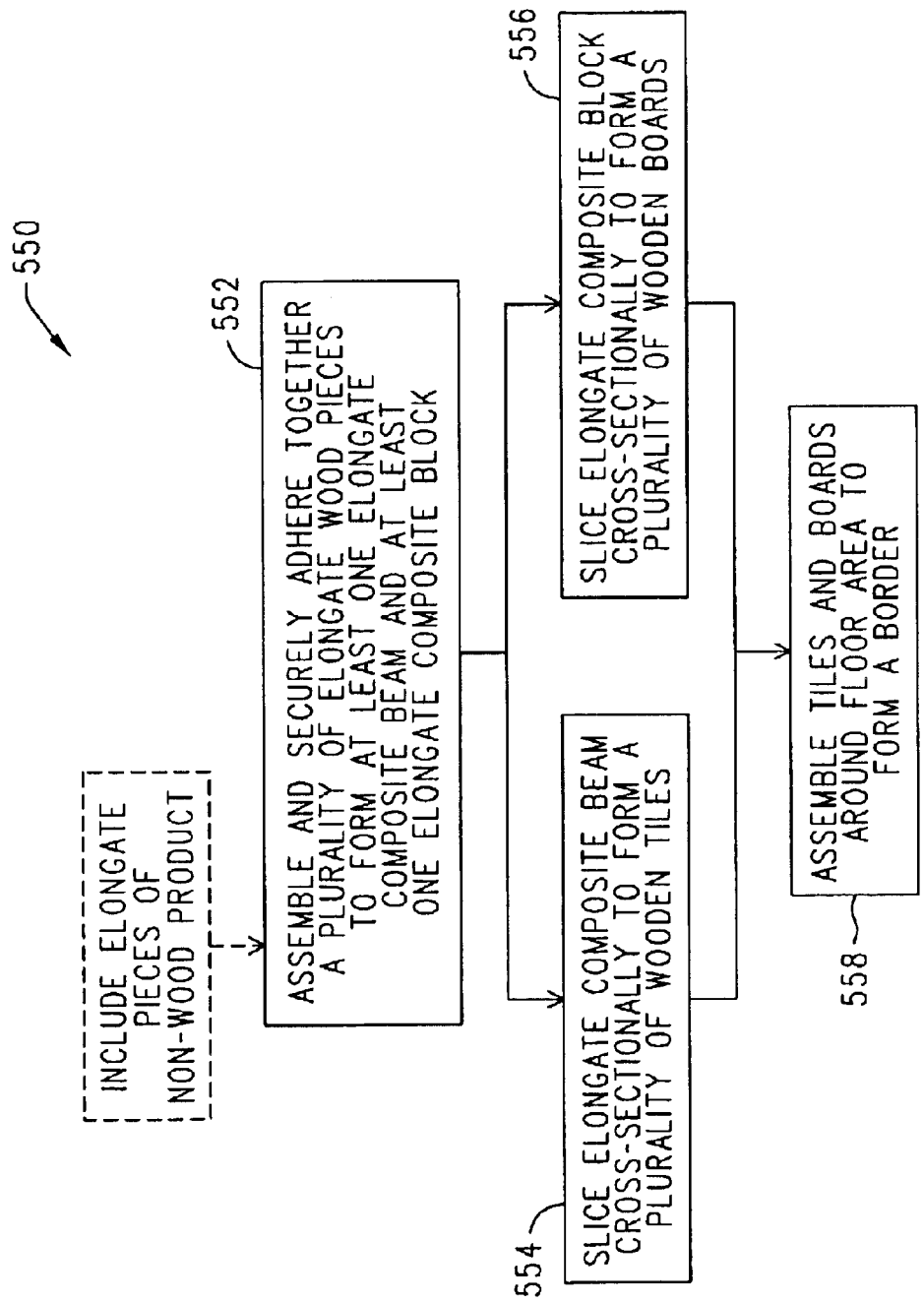
FIG. 18 is a flow chart illustrating a method for making the border of FIG. 17.

As shown in FIG. 17, a combination of tiles 10 and boards 210 of the type described above and having a complementary pattern thereon may be utilized to create a border 500.

The border 500 may be created by assembling at least one elongate composite beam (e.g., 12, FIGS. 1–3) and at least one elongate composite block (e.g., 212, FIG. 12) of the types described above. Then, the beam and block may be sliced cross-sectionally to form a plurality of wooden tiles have a predetermined decorative pattern thereon and a plurality of wooden boards having a complementary decorative pattern thereon. The wooden tiles and boards may then be assembled around a floor area 502 such as, for example, a floor area comprised of wood, tile, or stone.

With reference also to FIGS. 1–17, FIG. 18 illustrates a method 550 for making a border 500 for a floor area 502. The initial step 552 involves assembling and securely adhering together a plurality of elongate wood pieces (e.g., 14a–g, FIGS. 1–3; 214a–g, FIG. 12; 316a–h, FIG. 14) and, if desired, one or more elongate pieces of non-wood product (e.g., 40a–c, FIG. 4) to form at least one elongate composite beam 12, FIGS. 1–3, having a square cross-sectional shape and at least one elongate block 212, FIG. 12, having a rectangular cross-sectional shape with a width "W2" and a height "H2", wherein the width "W2" is substantially longer than the height "H2" as shown in FIG. 12 and described above.

In the next step 554, the elongate composite beam 12, FIGS. 1–3, is sliced cross-sectionally to form a plurality of wooden tiles 10 such that each of the wooden tiles has a predetermined, substantially uniform thickness "T1", FIG. 1 (or "T3", FIG. 15) and comprises at least one surface (front surface 30 and/or rear surface 32) having a predetermined decorative tile pattern thereon. The decorative tile pattern is substantially consistent among the wooden tiles 10 and has the rectangular cross-sectional shape of the beam 12. The decorative tile pattern also has a combination of end grain wood and flat grain wood, and possibly also includes a non-wood product, if desired.

The next step 556, which may be performed prior to, subsequently to, or concurrently with the previous step 554, involves slicing the elongate composite block 212, FIG. 12, cross-sectionally to form a plurality of wooden boards 210 such that each of the wooden boards has a predetermined, substantially uniform thickness "T2", FIG. 12 (or "T3", FIG. 15). Each of the wooden boards 210 comprises at least one surface (front surface 230 and/or rear surface 232) having a predetermined decorative board pattern thereon which is substantially consistent among the wooden boards and has the rectangular cross-sectional shape of the beam 212. The decorative board pattern is complementary to the decorative tile pattern. The decorative board pattern has at least one repeating pattern portion (e.g., 240, FIG. 12) and possibly at least one continuous pattern portion (e.g., 242, FIG. 12). The decorative board pattern also has a combination of end grain wood and flat grain wood, and possibly also includes a non-wood product, if desired. After slicing the elongate composite beam 12 or block 212, each of the plurality of elongate wood pieces (e.g., 14a–g, FIGS. 1–3; 214a–g, FIG. 12; 314a–h, FIG. 14) substantially maintains its pre-assembled cross-sectional shape.

The final step 558 of the method 550 involves assembling the plurality of wooden tiles 10 and the plurality of wooden boards 210 around the floor area 502, FIG. 17, to form the border 500.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

I claim:

1. A method for making a plurality of wooden boards from an elongate composite block, comprising:
   a) assembling and securely adhering together a plurality of elongate wood pieces comprised of at least two different species of wood, each of said plurality of elongate wood pieces having a pre-assembled cross-sectional shape, to form said elongate composite block having a rectangular cross-sectional shape with a width and a height, wherein said width is substantially longer than said height;
   b) slicing said elongate composite block cross-sectionally to form said plurality of wooden boards such that each of said wooden boards has a predetermined, substantially uniform thickness and comprises at least one surface having a predetermined decorative pattern thereon which is substantially consistent among said wooden boards, has said rectangular cross-sectional shape of said block, and at least partially comprises end grain wood, said decorative pattern comprising at least one repeating pattern portion comprised of said at least two different species of wood and that entirely comprises end grain wood; and
   c) wherein, after said slicing of said elongate composite block, each of said plurality of elongate wood pieces substantially maintains said pre-assembled cross-sectional shape.

2. The method of claim 1, said decorative pattern comprising a combination of end grain wood and flat grain wood.

3. The method of claim 2 wherein said step of assembling and securely adhering together a plurality of elongate wood pieces to form an elongate composite block having a rectangular cross-sectional shape comprises:
   a) pre-finishing each of said elongate wood pieces within a predetermined tolerance such that, when assembled, said elongate wood pieces form said elongate composite block having said rectangular cross-sectional shape;
   b) orienting said elongate wood pieces, each of said elongate wood pieces having a grain direction, such that said grain direction of at least one of said elongate wood pieces is generally perpendicular to said grain direction of at least another one of said elongate wood pieces in order to produce said decorative pattern comprising a combination of end grain wood and flat grain wood;
   c) applying adhesive to at least some of said elongate wood pieces;
   d) assembling said elongate wood pieces to form said elongate composite block having said rectangular cross-sectional shape; and
   e) allowing said adhesive to completely cure.

4. The method of claim 1, said decorative pattern further comprising at least one continuous pattern portion comprised of a single species of wood.

5. The method of claim 1 further comprising, during said step of assembling and securely adhering together a plurality of elongate wood pieces to form an elongate composite block having a rectangular cross-sectional shape, assembling and securely adhering at least one elongate piece of decorative, non-wood product along with said plurality of elongate wood pieces, such that said surface of each of said wooden boards is at least partially comprised of end grain wood and is also comprised of at least one decorative, non-wood product.

6. The method of claim 4 wherein said step of assembling and securely adhering together a plurality of elongate wood pieces and at least one elongate piece of non-wood product to form an elongate composite block having a rectangular cross-sectional shape comprises:
   a) pre-finishing each of said elongate wood pieces within a predetermined tolerance such that, when assembled, said elongate wood pieces and non-wood product form said elongate composite block having said rectangular cross-sectional shape;
   b) applying adhesive to at least some of said elongate wood pieces;
   c) assembling said elongate wood pieces and non-wood product to form said elongate composite block having said elongate rectangular cross-sectional shape; and
   d) allowing said adhesive to completely cure.

7. The method of claim 5 wherein said step of assembling and securely adhering together a plurality of elongate wood pieces and at least one elongate piece of non-wood product to form an elongate composite block having a rectangular cross-sectional shape comprises:
   a) cutting a first curved edge into a surface on a first one of said elongate wood pieces;
   b) cutting a second curved edge into a surface on a second one of said elongate wood pieces, said second curved edge being the opposite of said first curved edge so that said first curved edge fits into said second curved edge; and
   c) placing and adhering a thin, flexible, elongate sheet of non-wood product between and directly adjacent to both of said first curved edge and said second curved edge.

8. The method of claim 1 wherein said step of assembling and securely adhering together a plurality of elongate wood pieces to form an elongate composite block having a rectangular cross-sectional shape comprises:
   a) cutting a first curved edge into a surface on a first one of said elongate wood pieces;
   b) cutting a second curved edge into a surface on a second one of said elongate wood pieces, said second curved edge being the opposite of said first curved edge so that said first curved edge meshes with said second curved edge; and
   c) placing and adhering a thin, flexible, elongate wood piece between and directly adjacent to both of said first curved edge and said second curved edge.

9. The method of claim 1, wherein said step of slicing said elongate composite block cross-sectionally to form said plurality of wooden boards comprises slicing said elongate composite block very thinly to form veneer boards, and further comprising attaching each of said veneer boards to a relatively inexpensive piece of wood having said rectangular cross-sectional shape to form said plurality of wooden boards.

10. A wooden board produced by the method of claim 1.

11. A method for making a plurality of wooden tiles or boards from an elongate composite beam or block, comprising:
   a) assembling and securely adhering together a plurality of elongate wood pieces comprised of at least two different species of wood, each of said plurality of elongate wood pieces having a pre-assembled cross-sectional shape, to form said elongate composite beam or block having a rectangular cross-sectional shape;
   b) slicing said elongate composite beam or block cross-sectionally to form said plurality of wooden tiles or boards such that each of said wooden tiles or boards has a predetermined, substantially uniform thickness and comprises at least one surface having a predetermined decorative pattern thereon which is substantially consistent among said wooden tiles or boards, and has said rectangular cross-sectional shape of said beam or block, said decorative pattern comprising a combination of end grain wood and flat grain wood and at least one repeating pattern portion comprised of said at least two different species of wood; and c) wherein, after said slicing of said elongate composite beam or block, each of said plurality of elongate wood pieces substantially maintains said pre-assembled cross-sectional shape.

12. The method of claim 11, said decorative pattern further comprising at least one continuous pattern portion comprised of a single species of wood.

13. The method of claim 11 further comprising, during said step of assembling and securely adhering together a plurality of elongate wood pieces to form an elongate composite beam or block having a rectangular cross-sectional shape, assembling and securely adhering at least one elongate piece of decorative, non-wood product along with said plurality of elongate wood pieces, such that said surface of each of said wooden tiles or boards is at least partially comprised of end grain wood and is also comprised of at least one decorative, non-wood product.

14. The method of claim 13 wherein said step of assembling and securely adhering together a plurality of elongate wood pieces and at least one elongate piece of non-wood product to form an elongate composite beam or block having a rectangular cross-sectional shape comprises:

a) pre-finishing each of said elongate wood pieces within a predetermined tolerance such that, when assembled, said elongate wood pieces and non-wood product form said elongate composite beam or block having said rectangular cross-sectional shape;

b) applying adhesive to at least some of said elongate wood pieces;

c) assembling said elongate wood pieces and non-wood product to form said elongate composite block having said elongate rectangular cross-sectional shape; and d) allowing said adhesive to completely cure.

15. The method of claim 13 wherein said step of assembling and securely adhering together a plurality of elongate wood pieces and at least one elongate piece of non-wood product to form an elongate composite beam or block having a rectangular cross-sectional shape comprises:

a) cutting a first curved edge into a surface on a first one of said elongate wood pieces;

b) cutting a second curved edge into a surface on a second one of said elongate wood pieces, said second curved edge being the opposite of said first curved edge so that said first curved edge fits into said second curved edge; and c) placing and adhering a thin, flexible, elongate sheet of non-wood product between and directly adjacent to both of said first curved edge and said second curved edge.

16. The method of claim 11 wherein said step of assembling and securely adhering together a plurality of elongate wood pieces to form an elongate composite beam or block having a rectangular cross-sectional shape comprises:

a) pre-finishing each of said elongate wood pieces within a predetermined tolerance such that, when assembled, said elongate wood pieces form said elongate composite beam or block having said rectangular cross-sectional shape;

b) orienting said elongate wood pieces, each of said elongate wood pieces having a grain direction, such that said grain direction of at least one of said elongate wood pieces is generally perpendicular to said grain direction of at least another one of said elongate wood pieces in order to produce said decorative pattern comprising a combination of end grain wood and flat grain wood;

c) applying adhesive to at least some of said elongate wood pieces;

d) assembling said elongate wood pieces to form said elongate composite block having said rectangular cross-sectional shape; and e) allowing said adhesive to completely cure.

17. The method of claim 11 wherein said step of assembling and securely adhering together a plurality of elongate wood pieces to form an elongate composite beam or block having a rectangular cross-sectional shape comprises:

a) cutting a first curved edge into a surface on a first one of said elongate wood pieces;

b) cutting a second curved edge into a surface on a second one of said elongate wood pieces, said second curved edge being the opposite of said first curved edge so that said first curved edge meshes with said second curved edge; and c) placing and adhering a thin, flexible, elongate wood piece between and directly adjacent to both of said first curved edge and said second curved edge.

18. The method of claim 11, wherein said step of slicing said elongate composite beam or block cross-sectionally to form said plurality of wooden boards comprises slicing said elongate composite beam or block very thinly to form veneer tiles or boards, and further comprising attaching each of said veneer tiles or boards to a relatively inexpensive piece of wood having said rectangular cross-sectional shape to form said plurality of wooden tiles or boards.

19. A wooden tile or board produced by the method of claim 11.

20. A method for making a border for a floor area, said border comprising a plurality of wooden tiles and wooden boards, comprising:

a) assembling and securely adhering together a plurality of elongate wood pieces comprised of at least two different species of wood, each of said plurality of elongate wood pieces having a pre-assembled cross-sectional shape, to form at least one elongate composite beam having a square cross-sectional shape and at least one elongate block having a rectangular cross-sectional shape with a width and a height, said width being substantially longer than said height;

b) slicing said elongate composite beam cross-sectionally to form said plurality of wooden tiles such that each of said wooden tiles has a predetermined, substantially uniform thickness and comprises at least one surface having a predetermined decorative tile pattern thereon which is substantially consistent among said wooden tiles and has said rectangular cross-sectional shape of said beam, said decorative tile pattern comprising a combination of end grain wood and flat grain wood, and wherein, after said slicing of said elongate composite beam, each of said plurality of elongate wood pieces substantially maintains said pre-assembled cross-sectional shape;

c) slicing said elongate composite block cross-sectionally to form said plurality of wooden boards such that each of said wooden boards has a predetermined, substantially uniform thickness and comprises at least one surface having a predetermined decorative board pattern thereon which is substantially consistent among said wooden boards and has said rectangular cross-sectional shape of said beam, said decorative board pattern being complementary to said decorative tile pattern, said decorative board pattern comprising at least one repeating pattern portion comprised of said at least two different species of wood and a combination of end grain wood and flat grain wood, and wherein, after said slicing of said elongate composite block, each of said plurality of elongate wood pieces substantially maintains said pre-assembled cross-sectional shape; and d) assembling said plurality of wooden tiles and said plurality of wooden boards around said floor area to form said border.

21. The method of claim 20, said decorative board pattern further comprising at least one continuous pattern portion comprised of a single species of wood.

22. The method of claim 20 further comprising, during said step of assembling and securely adhering together a plurality of elongate wood pieces to form at least one elongate composite beam having a square cross-sectional shape and at least one elongate block having a rectangular cross-sectional shape, assembling and securely adhering at least one elongate piece of decorative, non-wood product along with said plurality of elongate wood pieces for each of said elongate composite beam and elongate composite block, such that said decorative tile pattern and said decorative board pattern each comprises a combination of end grain wood, flat grain wood, and at least one decorative, non-wood product.

23. A border produced by the method of claim 20.

* * * * *